United States Patent Office 2,797,744
Patented July 2, 1957

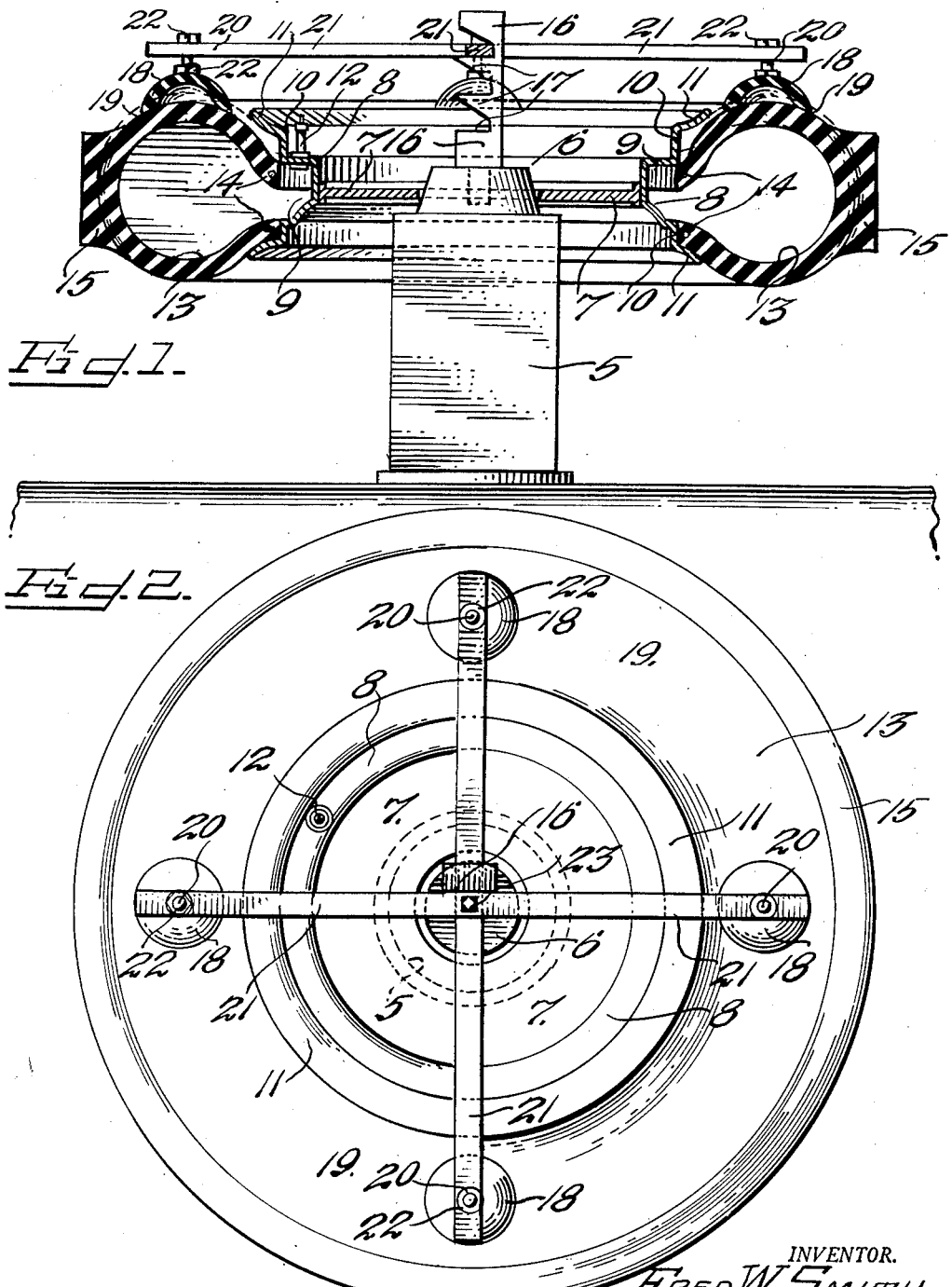

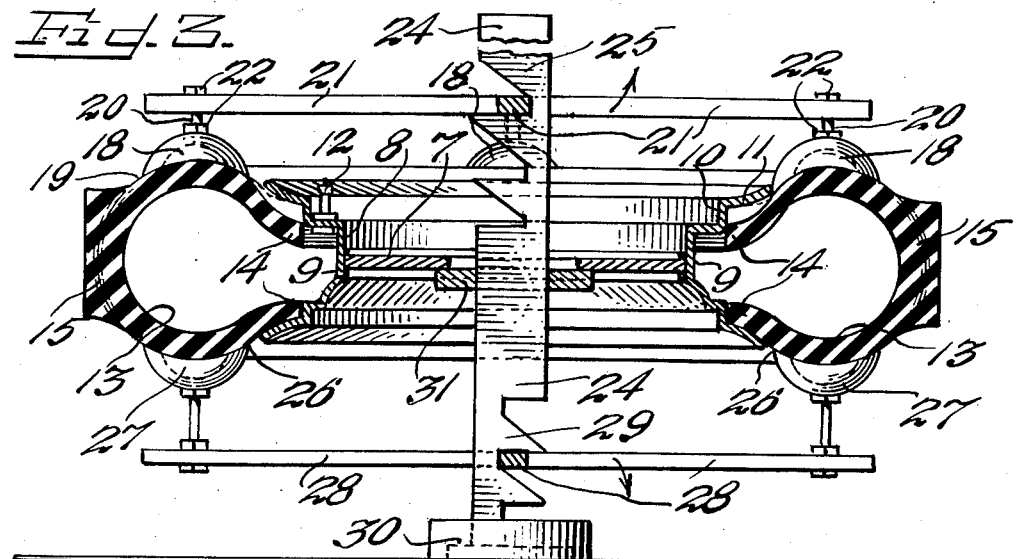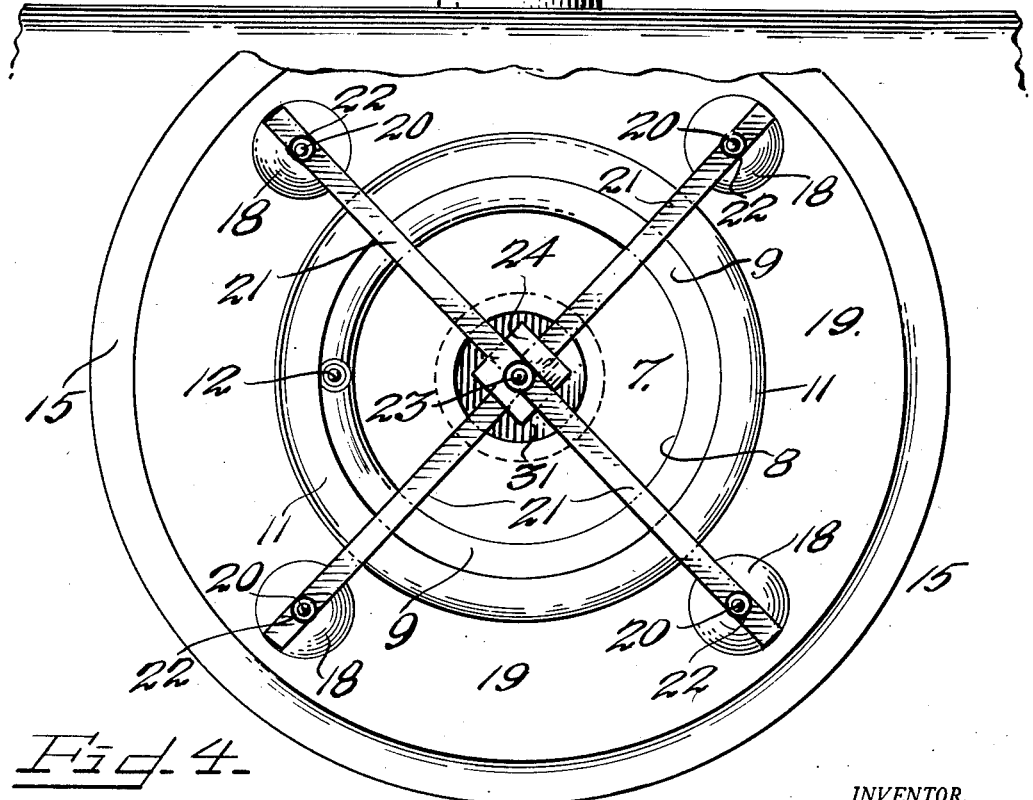

2,797,744

TIRE BEAD SEATING DEVICE

Fred W. Smith, Rutherford, N. J.

Application December 8, 1954, Serial No. 473,993

2 Claims. (Cl. 157—1.1)

The invention relates to an improved method of and apparatus for inflating tubeless tire casings and has particular reference to a means of mounting the demounted wheel on a supporting stanchion at a workable height and in such a position as to dispose the tire casing in mounted relation to the rim of the wheel therefor so that by its own weight, contact seals the lower tire bead against the rim flange, the upper bead sinking within the rim base, and while in a horizontal plane attach to the upper side wall of said tire casing a series of vacuum cups mounted on the ends of rods or sticks forming hand grips by which the upper tire bead is pulled into contact with the upper rim flange and held in engaging contact by means of a notched stanchion until said casing is fully inflated through the check valve disposed in said rim therefor.

The method embodies a mode of juxtapositioning of the demounted wheel on a supporting means in a horizontal plane, so that the tire casing and the channeled rim of the wheel assume co-related positioning with relation to one another; the weight of said tire seating one of its side wall beads, and the other side wall and bead loose within the confines of the rim base, and of manually attaching to the respective side walls of the casing of a number of vacuum cups carried on the ends of one or more rods or hand grip members by which the tire beads of the respective side walls thereof are forced into contact with the rim flanges and inflated, the peripheral surfaces of said rim and the inner wall of said casing forming a perfect sealing media for tubeless casings.

In the following there is described herein the general embodiment of the invention, the features thereof being more clearly defined hereinafter in the claims.

In the drawings:

Figure 1 is a transverse sectional view through a car wheel and rim and a tubeless tire casing in its mounting position after placement thereon by way of the drop center section of said rim resting on a supporting plate carried by a stanchion having cut therein a series of notches, and the position on the upper side wall of said casing of vacuum cups carried on the respective ends of cross bars or sticks as hand grips for lifting the upper tire bead into contact with the rim flange, said cross bars being disposed in said notches and retained therein until said casing is fully inflated through the check air valve therefor.

Figure 2 is a plan view of the structure shown in Figure 1 of the drawings.

Figure 3 is a transverse sectional view of the wheel, rim and tubeless casing of a modified form of structure employed in the method wherein a central stanchion support having upper and lower notched sections wherein when vacuum cups are placed on both upper and lower side wall sections of the tire, the cross connecting bars or sticks carrying said cups, said upper bars are manually lifted and placed in the upper notched section of the central stanchion, the lower cross bars treadle and foot actuated and forced in the lower notched portion of said stanchion and respectively retained at both upper and lower points until the tubeless tire casing is fully inflated; and Fig. 4 is a plan view of the structure shown in Figure 3 of the drawings.

Similar numerals of reference indicate corresponding parts throughout the several views of the drawings forming a part hereof.

In the drawings 5 designates a block stanchion or supporting member arranged to rest on a normal floor level having as a part thereof a conically shaped drum-head 6 as the centering core for the hub apertures in the standard type of demountable wheels.

The standard form of wheel comprises a web 7, having welded thereto on its periphery a rim 8 hot rolled and having formed therein a drop center channel 9, tire base shoulders 10 and straight side flanges 11, and having mounted in the outer face of said drop center section a check valve 12.

The tubeless tire casing 13 with tire beads 14 and reinforced tread 15 is mounted on rim 8 by clinching the tire beads within the drop center section 9 of said rim 8 and of snapping the opposite side tire beads 14 over the flanges 11 of said rim and when within the rim channels moved annularly to a position concentric with the channels and shoulders in said rim, and then turned to a horizontal position and mounted on the drum-head 6 of the stanchion 5.

The normal weight of the casing 13 will cause the lower tire bead 14 to rest in and contact the lower shoulder 10 and flange 11, the upper tire bead 14 hanging free.

An auxiliary supporting stud 16 having notched rests 17 is mounted in drum-head 6 and capable of annular rotation for proper positioning.

When wheel, rim and tire structure are in proper relation to one another a series of vacuum cups 18 are attached at axially opposed points on the upper face of the side wall 19 of casing 13, said cups 18 being carried by studs 20 mounted in the ends of cross bars 21 and fastened to said cups and bars by set nuts 22 and joined at their central portion by set lug 23, said rods or cross bars 21 being similarly set in opposed relationship form suitable hand grips or manual actuating means for lifting the upper tire bead 14 into contact with the shoulder seat and rim flange 11 of the rim, one or both cross bars 21 being forced into the notches 17 of the supporting stud 16 and retained in that position during the inflation of the tire casing through the check valve 12 therefor.

By manual operation and control of the device as described the inner wall of casing 13 and the peripheral surfaces of the rim sections effect a hermetically sealed chamber between said tire casing and rim for the more efficient form of tubeless pneumatic tire casing.

With reference to Figures 3 and 4 of the drawings the wheel, rim and tire components are the same as that of the structure as is hereinabove described, with the exception that a modified form of tire bead spreader means is employed.

The variance in structural set-up consists of a central stanchion or supporting post 24 being notched at upper end at 25 to take cross bars or hand grip arms 21 the upper tire bead 14 seating means, and the bottom side wall surface 26 of the casing 13 has mounted thereon vacuum cups 27 carried by cross arms 28 and arranged for mounting in the inverted notches 29 in the lower portion of post 24, said arms being used as a treadle and actuated by the pressing of the foot downwardly to set and seal both the lower and upper side walls and beads of a tubeless tire casing, said central stanchion 24 being set in floor plate 30 for normal floor mounting, and having a height positioning support 31 for disposing the tire and wheel at the proper working level.

The method herein consists of disposing a wheel, rim and tire on a horizontal plane on a supporting means to retain said structure at a proper working level and of attaching to the tubeless tire casing of a series of vacuum cups carried by opposed hand grip and foot treadles for manually moving either the upper or both upper and lower tire casing beads into retained contact with the rim of said wheel to effect a sealing moment for the inflation of tubeless tire casings.

It is obvious that the method and structural detail employed thereunder may be varied in a multiplicity of ways without departing from the spirit of the invention.

What is claimed and desired to secure herein by Letters Patent of the United States is:

1. A device for spreading the beads of a partially mounted tubeless tire into sealing engagement with the rim flange of the wheel comprising, vacuum means engageable with the exterior surface of each side wall of said tire, supporting bars on each side of the tire casing secured to said vacuum means and means for separating said bars to force the beads of the tire into contact with the peripheral surface of the wheel rim prior to the inflation of said casing.

2. A device for spreading the beads of a partially mounted tubeless tire into sealing engagement with the rim flange of the wheel comprising, a plurality of vacuum cups engageable with the exterior surface of the walls each side of the tire casing, supporting bars secured to said cups and spreading means interposed between said supporting bars, whereby said bars may be separated to force the beads of the casing into contact with the peripheral surface of the rim prior to inflation of the casing.

References Cited in the file of this patent

UNITED STATES PATENTS

| | | |
|---|---|---|
| 1,610,363 | Davis | Dec. 14, 1926 |
| 1,718,959 | Hubbard | July 2, 1929 |
| 1,801,305 | Drake | Apr. 21, 1931 |
| 1,966,580 | Bull | July 17, 1934 |
| 2,043,169 | Hawkinson | June 2, 1936 |
| 2,684,112 | Coats | July 20, 1954 |